June 9, 1942.  A. WOODS  2,285,550
DISK CONTROL AND DRAFT UNIT
Filed May 31, 1941  3 Sheets-Sheet 1

INVENTOR.
Andrew Woods
BY
Webster Herbert
ATTORNEY.

June 9, 1942.  A. WOODS  2,285,550
DISK CONTROL AND DRAFT UNIT
Filed May 31, 1941  3 Sheets-Sheet 2
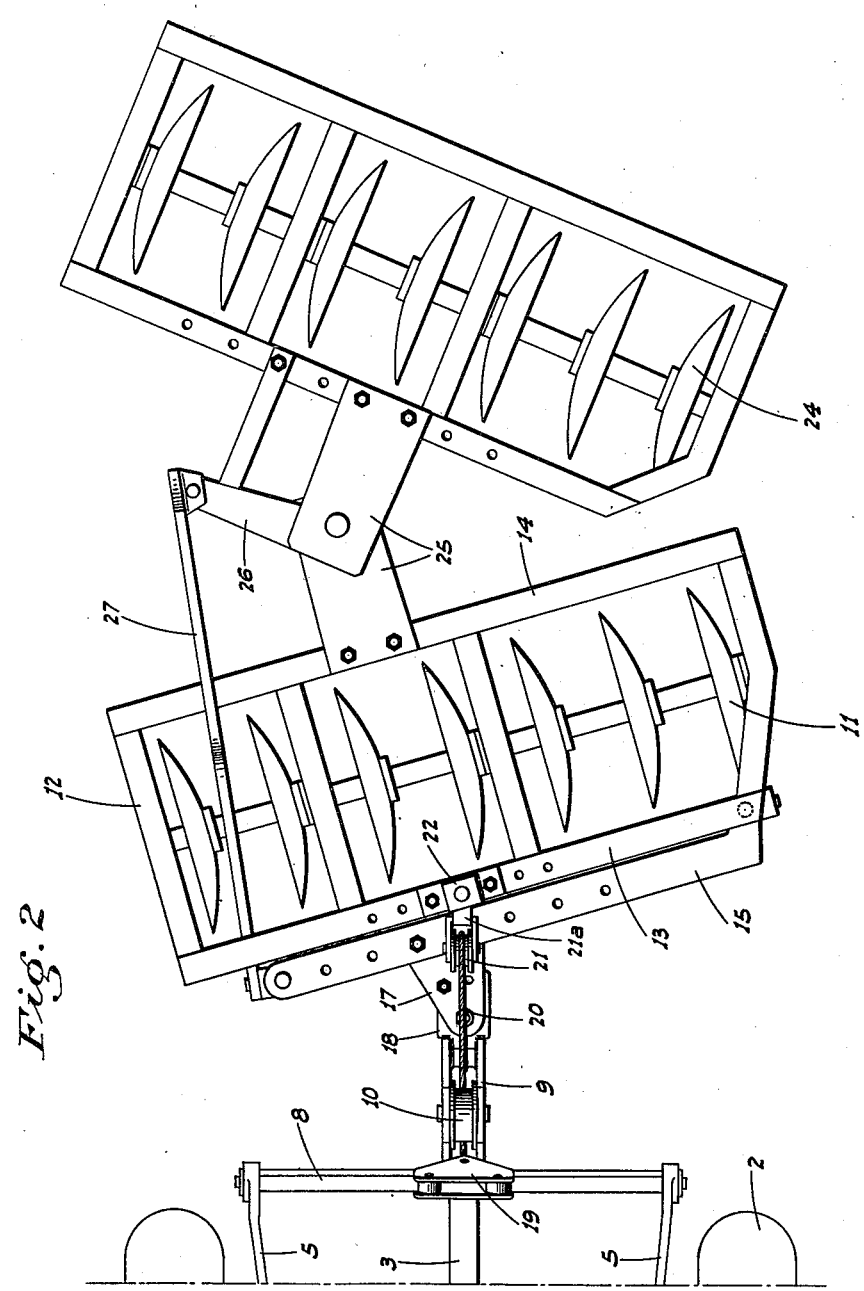
INVENTOR.
Andrew Woods
BY
ATTORNEY.

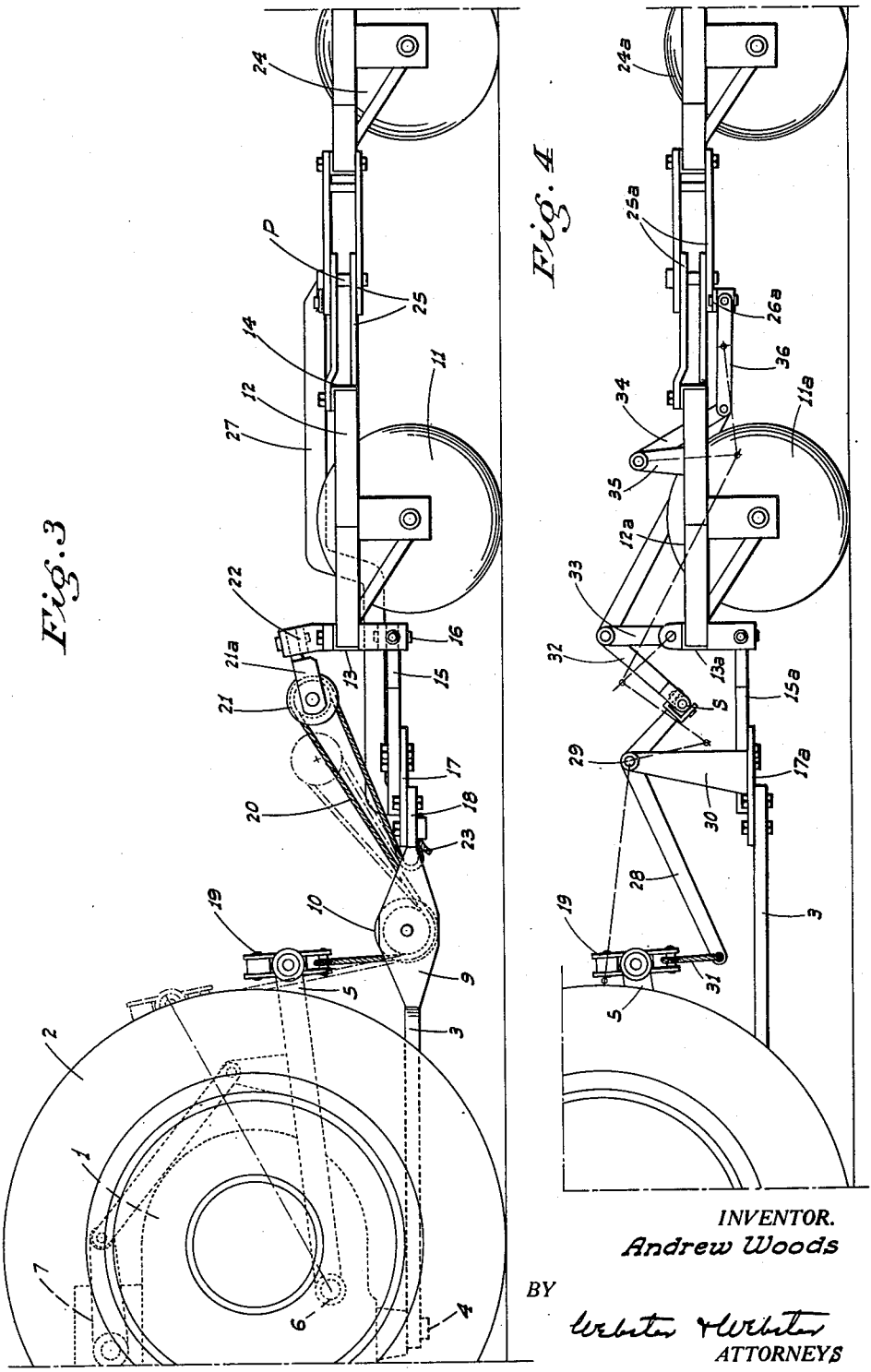

Patented June 9, 1942

2,285,550

UNITED STATES PATENT OFFICE 2,285,550

DISK CONTROL AND DRAFT UNIT

Andrew Woods, Porterville, Calif., assignor of one-half to George Easton, Porterville, Calif.

Application May 31, 1941, Serial No. 395,937

16 Claims. (Cl. 55—83)

This invention relates in general to disk gangs and the connection with, and control thereof from, the tractor, the invention being directed particularly to, and it is my principal object to provide, a disk control and draft unit arranged for power operation from the tractor and under the control of the tractor driver.

A further object of the invention is the provision of disk gang control mechanism which is operative, regardless of the relative angle of draft between the tractor and the disk gangs, to effect desired changes in the angle of cut and depth of penetration.

Another object of the invention is to provide a disk gang control mechanism in which the relative penetration of either gang in a dual or tandem gang implement may be regulated by a simple adjustment of certain parts of said mechanism.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a similar view but with the gangs angled.

Figure 3 is a side elevation of the tandem gang implement embodying the invention and as connected with a tractor.

Figure 4 is a somewhat diagrammatic side elevation of a tandem gang implement embodying the invention in modified form.

Figure 1:
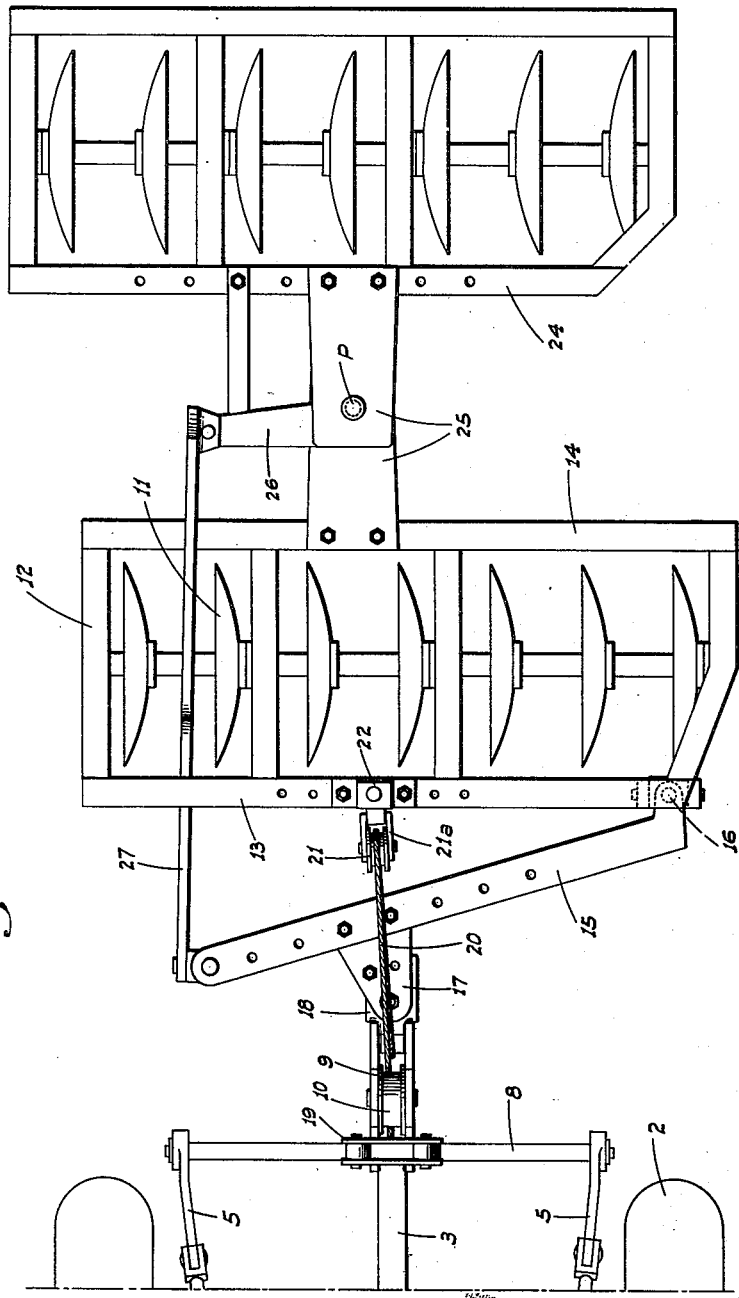
Figure 1 is a plan view of a tandem gang implement embodying the invention and connected with a tractor; the gangs being in closed or parallel position.

Referring now more particularly to the characters of reference on the drawings, and at present to the disclosures of Figs. 1–3, inclusive, the numeral 1 indicates a tractor supported at the rear ends by wheels 2 and provided with an under axle drawbar 3 pivoted on the tractor at 4 for horizontal swinging movement. The tractor includes rearwardly projecting, parallel arms 5 pivoted at 6 for vertical swinging action by link connected power arms or units 7 under selective control of the tractor driver in any suitable manner. The arms 5 are relatively widely spaced and are connected at their rear ends by a horizontal and rigid crossbar 8 of substantial length.

The drawbar 3 projects rearwardly some distance beyond the vertical plane of crossbar 8, but immediately below said crossbar the drawbar is formed with vertical, transversely spaced plates 9 between which a pulley or sheave 10 is journaled on a horizontal axis.

The forward disk gang, indicated generally at 11, includes a surrounding frame 12 of rigid and horizontal construction; the forward beam of the frame being indicated as 13 and the rearward beam as 14. A sway bar or swing beam 15 is disposed horizontally ahead of frame beam 13, and is pivoted at one end to one forward end or corner of gang frame 12, as at 16; this swing beam being somewhat shorter than frame beam 13.

A connection plate 17 is mounted on swing beam 15 and projects forwardly therefrom to rigid and non-angling connection with the flat rear end member 18 of drawbar 3; plate 17 and beam 15 being arranged so that the former may be mounted in different positions along said beam.

A roller carrier 19 is mounted on cross beam 8 and is free to move along said crossbeam between arms 5; there being a cable 20 connected at one end to the carrier below crossbar 8. From carrier 19 the cable 20 passes about sheave 10 from its forward side and thence extends upwardly and rearwardly to a sheave 21. This sheave is mounted in a rigid support 21a which in turn is mounted for swivel movement in a horizontal plane on a bracket 22. This bracket is rigidly mounted on top of beam 13 intermediate its ends, for adjustment along the same. The sheave is vertically offset in its support relative to the bracket contacting face of the latter, so that by inverting said support on the bracket, the level of the sheave itself will obviously be altered. The purpose of this arrangement will be seen later. The cable passes about sheave 21 from above, and then the free end extends back to a point adjacent sheave 10 where it passes between plates 9 and is anchored on member 8 as at 23.

The above described structure is operative in the following manner to control the angle of the forward gang 11.

When the arms 5 are in lowered position (see Fig. 3) the gang 11 is disposed straight; i. e., at right angles to the path of travel; the swing beam 15 then being disposed at an acute forward angle relative to frame beam 13. To angle the gang 11, the tractor operator causes actuation and raising of power arms 7, which results in arms 5 swinging upward about pivots 6. This pulls upward on cable 20 effecting a shortening of the runs of the cable between sheaves 10 and 21 and drawing the latter toward each other. This causes swing beam 15 and frame beam 13 to close relative to each other, and the gang assumes an angled position as beam 15 is rigid with draw bar 3.

By virtue of the use of carriage 19 on cross bar 8, and the described sheave and cable arrangement, the angle control of the gang can be accomplished with ease regardless of the relative angle between the tractor and gang; the carrier sliding along cross bar 8 to remain substantially vertically alined with sheave 10 as the draw bar swings laterally.

When a tandem disk gang implement is used, the rear or following gang is controlled by means of the following arrangement:

The rear gang, indicated at 24, is connected in draft relation with the front gang 11 by means of lapping plate units 25, as is common; said units being pivoted together as at P. A lateral and rigid lever arm 26 is formed on and projects horizontally from the plate unit 25 secured to the rear gang, and such arm is of a length to provide considerable leverage. A tie rod or arm 27 is pivoted at its ends on the outer and free ends of swing bar 15 and lever arm 26. It will thus be seen that while gangs 11 and 24 are parallel when beams 15 and 13 are open relative to each other, closing of said beams toward each other not only angles gang 11 but oppositely angles gang 24 (see Fig. 2) due to the shifting of pivot point P relative to tie bar 27 as gang 11 angles.

Adjustment of the block 22 and attached sheave 21 along frame beam 13 is used to provide proper alinement with sheave 10 when the connection of the drawbar with the sway bar 15 is changed.

Regulation of disk penetration is accomplished by shifting the vertical position of sheave 21 on its securing bracket 22, by inverting the mounting yoke 21 of said sheave on the bracket as previously stated. Such adjustment of the sheave alters the angle of the run of the cable 20 between sheaves 10 and 21 relative to the drawbar. This gives a truss-like action which transfers the vertical pull of the cable to the rear gang when the sheave 21 is in its upper position and said angle is relatively great. When, however, said sheave is in its lower position and the angle of pull is reduced, less truss-like action is had and the vertical lift is taken on the front gang.

This traction feature is very important, since the angling of the control cable enables the lift obtained on the tractor cross-bar 8 to be transferred to the rear gang so as to thus secure the necessary traction without reducing the effective weight of the gangs.

Another valuable advantage obtained with my cable control is that maximum pull on the cable is had when the disks are in full cut, giving the greatest traction when required and thus reducing traction loss.

It should be further noted that the implement is pulled by the cable which is in effect attached to the front frame bar 13. All the tractive effort of the tractor thus has a downward pressure effect on the cross-bar 8, thereby adding traction to the rear wheels of the tractor.

It should also be noted that the gangs are forced to cutting position or angle with the power means, and are relieved from angled position by the draft of the tractor when the power means is released.

In the modification shown in Fig. 4, the gang control mechanism is in the main a mechanical linkage and lever assembly which comprises a downwardly facing or inverted bell crank 28 pivoted intermediate its ends at 29 on the upper end of a bracket 30 upstanding from connection plate 17a which projects forward from swing beam 15a; plate 17a being connected with draw bar 3.

The forward arm of bell crank 28 is relatively long and extends to a point below carrier 19, to which it is connected by a relatively short length of cable 31. The rear and relatively short arm of bell crank 28 is swivelly connected at its lower end as at S, to the lower end of the forward arm of another inverted bell crank 32; said connected arms being of similar length. This other bell crank 32 is pivoted intermediate its ends on the upper end of an upstanding swing link 33 mounted on top of the front beam 13a of the frame 12a of the forward gang 11a. By suitable construction, the rear and elongated arm of bell crank 32 is considerably laterally offset relative to the forward arm and extends rearwardly and downwardly to pivotal connection with a depending swing link 34 which depends from a bracket 35. A linkage 36 connects between the lower end of swing link 34 and the outer end of a lateral arm 26a which projects, as in the previously described embodiment, from the connecting plate unit 25a of rear gang 24a.

It will be seen that upon raising movement of tractor arms 5 and carrier 10, the described lever and linkage assembly will assume the position shown in broken lines in Fig. 4, and will transmit such movement so as to pull both gangs into angled position and into a cutting operation, while at the same time carrier 19 permits of such movement regardless of the position of the tractor relative to the disk gang implement.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In the combination of a tractor and tandem disk gangs connected thereto in draft relation; a disk control and draft assembly comprising a draw bar on the tractor, a beam rigidly mounted on the rear end portion of the draw bar and projecting laterally therefrom at a rearward angle, the forward disk gang including a frame extending transversely of the direction of travel, means pivoting the outer end of said beam to said gang frame at the front and adjacent one end, a power unit on the tractor, means connected between said gang frame and power unit to effect predetermined relative pivotal movement between the gang frame and said beam upon actuation of said power unit, longitudinal connection plates projecting from the forward and rear gangs on adjacent sides, means pivoting said plates together, a rigid lateral arm projecting from the plate of the rear gang, and a tie-bar extending between and pivoted to the outer end of said arm and said beam.

2. In the combination of a tractor and a disk gang connected thereto in draft relation; a disk control and draft assembly comprising a draw bar on the tractor, a beam rigidly mounted on the rear end portion of the draw bar and projecting laterally therefrom at a rearward angle, the disk gang including a frame extending transversely of the direction of travel, means pivoting the outer end of said beam to said gang frame at the front and adjacent one end, a power unit on the tractor, a sheave journaled on the draw bar, a vertically movable member mounted on the tractor above said sheave, a cable extending about said sheave from the front, one end of the cable extending to the gang frame at the front intermediate its ends, the other end of the cable being connected to said member, and connecting means between said power unit and member operative to raise the latter upon actuation of the unit.

3. In the combination of a tractor and a disk gang connected thereto in draft relation; a disk control and draft assembly comprising a draw bar on the tractor, a beam rigidly mounted on the rear end portion of the draw bar and projecting laterally therefrom at a rearward angle, the disk gang including a frame extending transversely of the direction of travel, means pivoting the outer end of said beam to said gang frame at the front and adjacent one end, a sheave journaled on the draw bar, a cross bar disposed above the draw bar, means mounting said cross bar on the tractor for vertical movement, a power unit on the tractor arranged to so move said cross bar, a carrier movable along said cross bar from end to end thereof, and a cable connected to said carrier, and passing thence about said sheave from the front and then extending to a point on the gang frame at the front intermediate its ends.

4. A structure as in claim 3 including another sheave mounted on the gang frame at said point; the cable extending about said sheave and thence extending forward to an anchor on the draw bar.

5. A structure as in claim 3 including another sheave mounted on the gang frame for adjustment lengthwise of said frame; the cable extending about said sheave and thence extending forward to an anchor on the draw bar.

6. A structure as in claim 1 in which said arm projects in a lateral direction opposite from said beam pivot, and the beam extends in said direction beyond the draw bar, the forward end of the tie bar connecting with said extended portion of the beam.

7. In the combination of a tractor and a disk gang connected thereto in draft relation; a draw bar projecting rearwardly from the tractor, means connecting the draw bar and gang for relative angling movement of the latter, a vertically movable cross bar mounted on the tractor above the draw bar, a power unit on the tractor arranged to so move the cross bar, a carrier movable along said cross bar, a cable direction changing element mounted on the draw bar below said cross bar, and a cable extending between said cross bar and the gang and passing about said element therebetween, said cable being operative to control said relative angling of the gang.

8. In the combination of a tractor and a disk gang connected thereto in draft relation; a draw bar projecting rearwardly from the tractor, means connecting the draw bar and gang for relative angling movement of the latter, a vertically movable cross bar mounted on the tractor above the draw bar, a power unit on the tractor arranged to so move the cross bar, a carrier movable along said cross bar, and means connected between the gang and draw bar to control said relative angling of the gang, said means including a flexible element connected with said carrier.

9. In the combination of a tractor and a disk gang connected thereto in draft relation; a draw bar projecting rearwardly from the tractor, means pivoting the gang in connection with the draw bar for relative angling movement, a sheave mounted on the draw bar ahead of said pivot means, a cable passing about the sheave from the front, a power unit on the tractor, a connection between the power unit and cable above said sheave, the cable rearwardly of the sheave extending to said gang, and a cable engaging member mounted on the gang at the front and in spaced relation to said pivot, said member being adjustable lengthwise of the gang.

10. In the combination of a tractor and a tandem disk gang implement connected thereto in draft relation; a gang control and draft assembly comprising a draw bar projecting rearwardly from the tractor, a swing beam rigidly secured intermediate its ends on the rear end of the draw bar, said beam being disposed diagonally of the line of travel, means pivoting the rearmost end of said beam to the forward gang adjacent its corresponding end, a cross bar disposed above the draw bar, means mounting said cross bar in connection with the tractor for vertical movement, a carrier on said cross bar, a sheave journaled on the draw bar below said cross bar, another sheave mounted in connection with the forward gang intermediate its ends, a cable extending from said carrier about said one sheave, thence to and about said other sheave and back to an anchor on the drawbar, a laterally projecting angle control arm on the rear gang, said arm projecting in the same lateral direction as the other end of said diagonal beam, and a tie rod pivoted on and connecting the outer end of said arm and said other end of the diagonal beam.

11. In the combination of a tractor and a disk gang having draft connecting means which includes a drawbar projecting rearwardly from the tractor; a disk control means comprising with a rigid vertically movable member on the tractor at its rear end above the drawbar and normally held against downward movement, a pull unit secured on and depending from said member above the drawbar, an element on the drawbar engaging the unit and means on the gang at its forward end and above the drawbar to which said unit is connected.

12. In the combination of a tractor and a disk gang having draft connecting means which includes a drawbar projecting rearwardly from the tractor; a disk control means comprising with a rigid vertically movable member on the tractor at its rear end above the drawbar and normally held against downward movement, a pull unit secured on and depending from said member above the drawbar, an element on the drawbar engaging the unit and means on the gang at its forward end and above the drawbar providing a vertically adjustable connection for the unit.

13. In the combination of a tractor and a disk gang having draft connecting means which includes a drawbar projecting rearwardly from the tractor; a disk control means comprising with a rigid vertically movable member on the tractor at its rear end above the drawbar and normally held against downward movement, a pull cable depending from said member, a sheave on the drawbar under which the cable passes, and a vertically adjustable cable engaging element on the gang at its front end and above the drawbar sheave.

14. In the combination of a tractor and a trailing implement, a steering assembly connecting the tractor and implement in vertically rigid relation, while allowing of limited relative longitudinal movement therebetween, said assembly including a tongue member substantially immovable longitudinally and vertically relative to the tractor, a separate pull unit extending lengthwise of and connecting between the tractor and implement in draft relation to the latter, said pull unit being anchored at the forward end on the tractor adjacent its rear end and at a point above said tongue member, and means on said tongue member below said point cooperating with said unit intermediate the ends of the latter whereby the draft of the implement imparts a downward, traction increasing pull to the tractor at said point of anchorage.

15. A structure as in claim 14 in which said pull unit connects with the implement rearwardly of said means and at a point thereabove.

16. In the combination of a tractor and a trailing implement, a steering assembly connecting the tractor and implement in vertically rigid relation, while allowing of limited relative longitudinal movement therebetween, said assembly including a tongue member substantially immovable longitudinally and vertically relative to the tractor, a flexible pull element extending lengthwise of and connected between the tractor and implement in draft relation to the latter, said flexible pull element being anchored at the forward end on the tractor adjacent its rear end and at a point above said tongue member, and a direction changing pulley mounted on said tongue member below said point and about which pulley the flexible element extends intermediate its ends whereby the draft of the implement imparts a downward, traction increasing pull to the tractor at said point of anchorage.

ANDREW WOODS.